(12) United States Patent
DeCesare et al.

(10) Patent No.: US 8,464,987 B1
(45) Date of Patent: Jun. 18, 2013

(54) ADJUSTABLE CONDUIT CLAMP

(75) Inventors: Christopher W. DeCesare, Naugatuck, CT (US); Erik G. Senseney, Fairfield, CT (US); Joseph M. Thomas, North Haven, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 13/488,969

(22) Filed: Jun. 5, 2012

(51) Int. Cl.
*F16L 3/08* (2006.01)
*A47F 1/00* (2006.01)

(52) U.S. Cl.
USPC ... 248/74.5; 248/74.4; 248/74.1; 248/292.12; 248/298.1; 24/569; 24/458; 403/87; 403/121

(58) Field of Classification Search
USPC ............. 248/298.1, 292.12, 73, 74.1, 74.5, 248/74.4, 67.5, 230.3, 231.41, 66, 230.2, 248/72, 297.21, 222.11, 221.11, 297.31, 248/297.51, 299.1; 24/457, 16 R, 17 A, 19, 24/268–273, 274 R, 274 P, 274 WB, 275–286, 24/20 R, 569, 258, 20 LS, 20 TT, 20 EE, 24/23 EE, 23, 21; 403/87, 121, 256, 258, 403/260, 262, 385, 386, 397
See application file for complete search history.

(56) References Cited

U.S. PATENT DOCUMENTS

| | | | | |
|---|---|---|---|---|
| 2,499,981 A | * | 3/1950 | Strobel | 24/135 R |
| 2,884,214 A | * | 4/1959 | Wrobel | 248/74.3 |
| 3,157,001 A | * | 11/1964 | Vail | 47/47 |
| 3,562,701 A | * | 2/1971 | Verespej | 439/811 |
| 4,825,513 A | * | 5/1989 | Verespej | 24/135 N |
| 5,039,181 A | * | 8/1991 | Lautenschlager | 312/334.7 |
| 5,244,301 A | * | 9/1993 | Kurke et al. | 403/390 |
| 5,357,654 A | * | 10/1994 | Hsing-Chi | 24/68 B |
| 5,722,718 A | * | 3/1998 | Still et al. | 297/215.15 |
| 6,010,045 A | * | 1/2000 | Rogers et al. | 224/198 |
| 7,055,786 B2 | * | 6/2006 | Garassino et al. | 248/220.22 |
| 7,097,666 B2 | * | 8/2006 | Curtis | 623/38 |
| 7,959,114 B2 | * | 6/2011 | Spreitzer et al. | 248/62 |
| 8,087,629 B2 | * | 1/2012 | Gotovac | 248/299.1 |
| 8,317,526 B2 | * | 11/2012 | Gardner et al. | 439/100 |
| 2002/0142674 A1 | * | 10/2002 | Chadbourne et al. | 439/783 |

* cited by examiner

*Primary Examiner* — Kimberly Wood
(74) *Attorney, Agent, or Firm* — Ware, Fressola, Maguire & Barber LLP

(57) ABSTRACT

An adjustable conduit clamp to secure a conduit to a structure has a clampback and a strap that interfits therewith. The clampback has sidewalls configured to be placed against a structure and a portion of each sidewall configured to support a conduit. A first spacer is positioned between the sidewalls at a first region of the sidewalls and a second spacer positioned between the sidewalls at a second region. A cantilever member extends from the second spacer and is positioned between the first and second sidewalls, the cantilever member having a free end movable relative to the sidewalls and spaced from an end of the first spacer so as to form an opening therebetween for passage of the strap. The strap has a first end portion shaped to contact a conduit and a second end portion dimensioned for passage through the opening in the clampback.

28 Claims, 9 Drawing Sheets

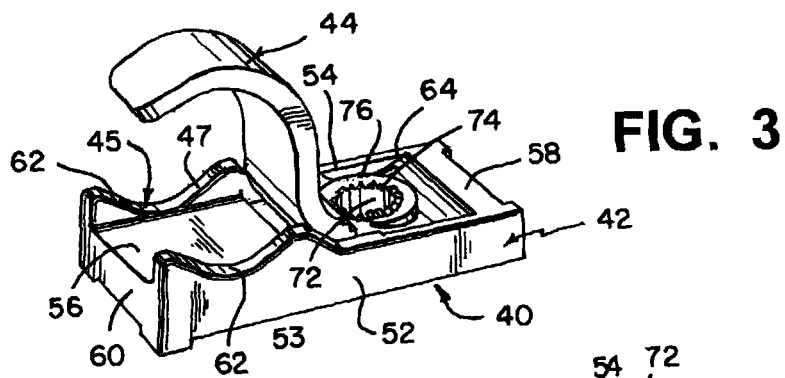
FIG. 3
FIG. 5
FIG. 5A
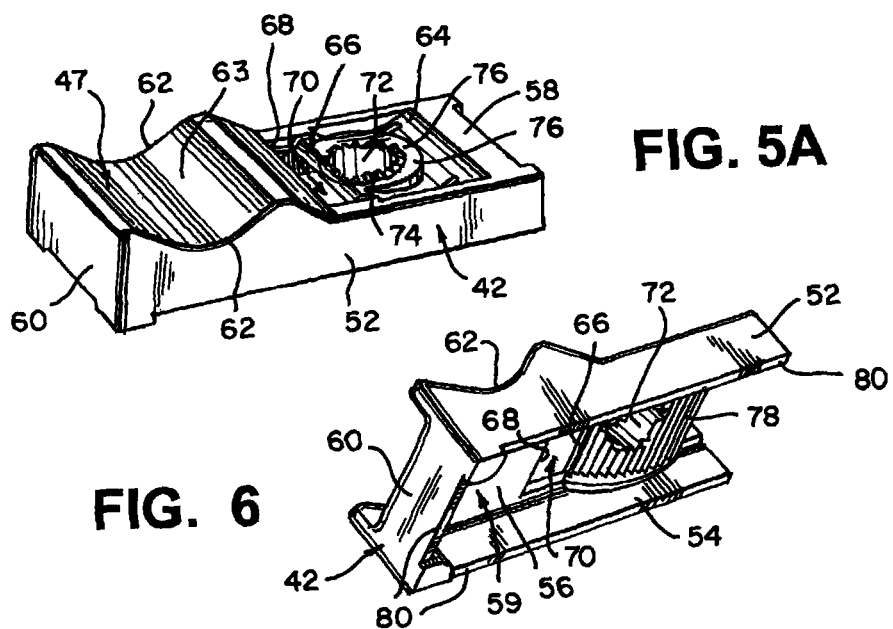
FIG. 6

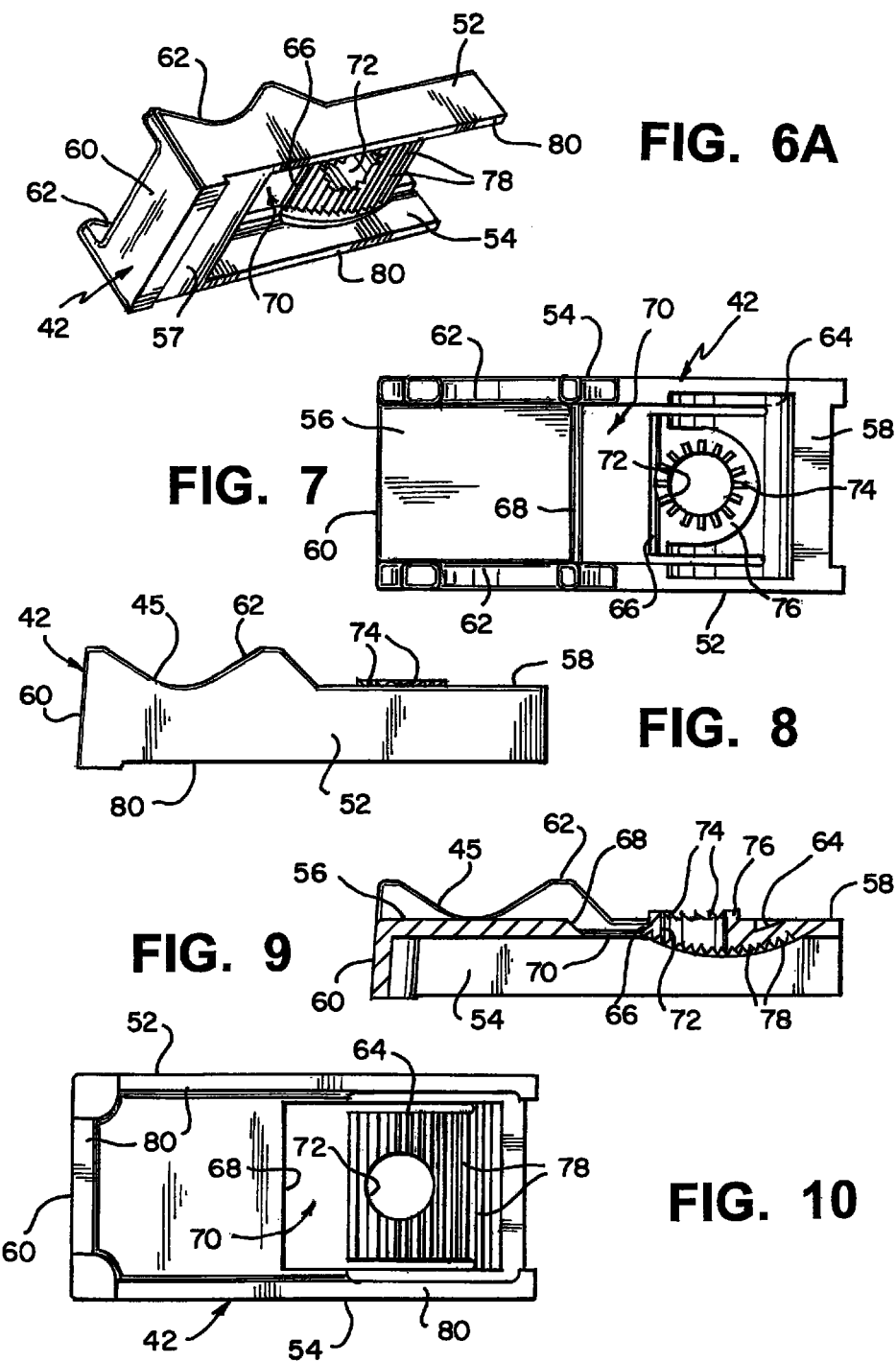

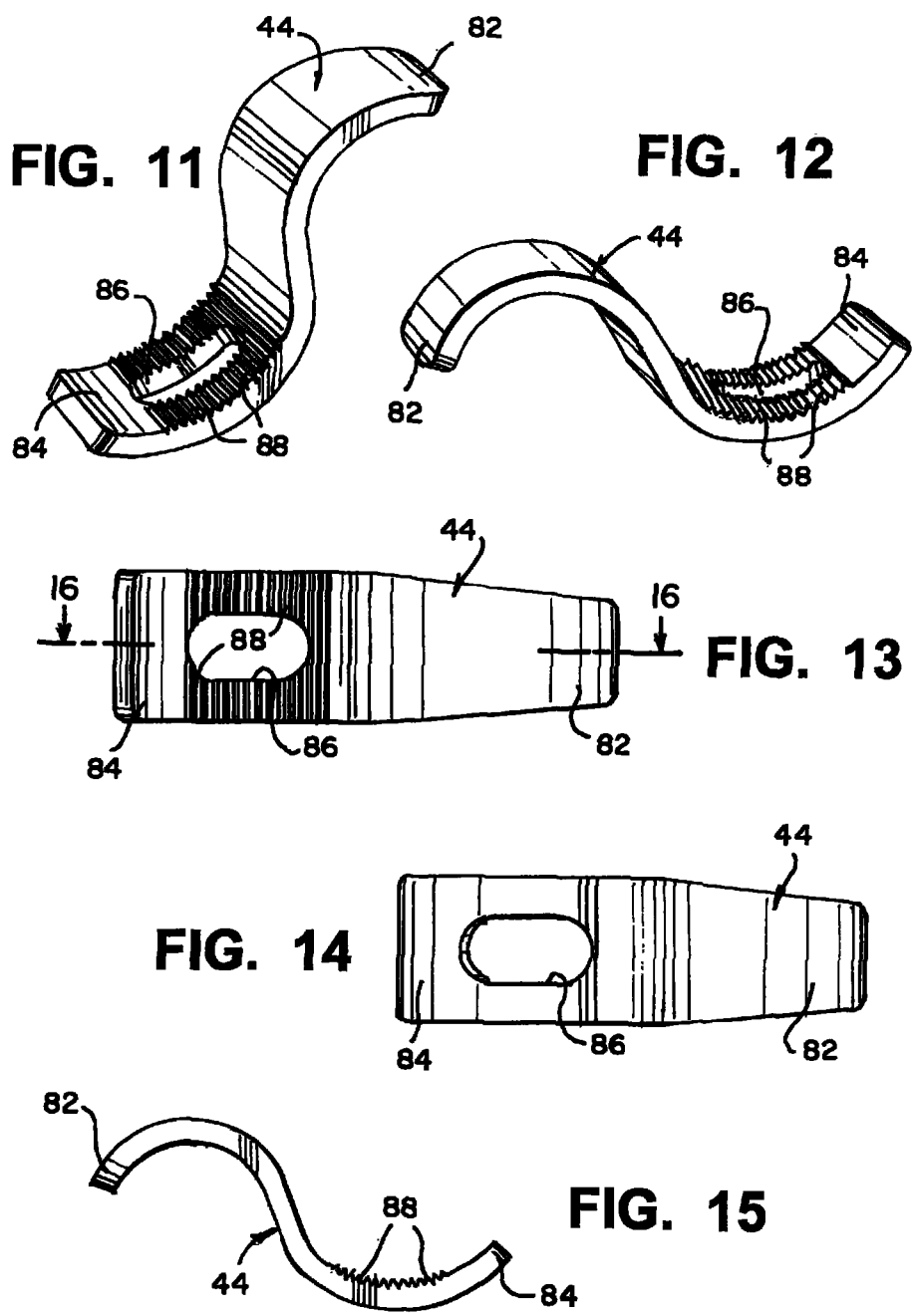

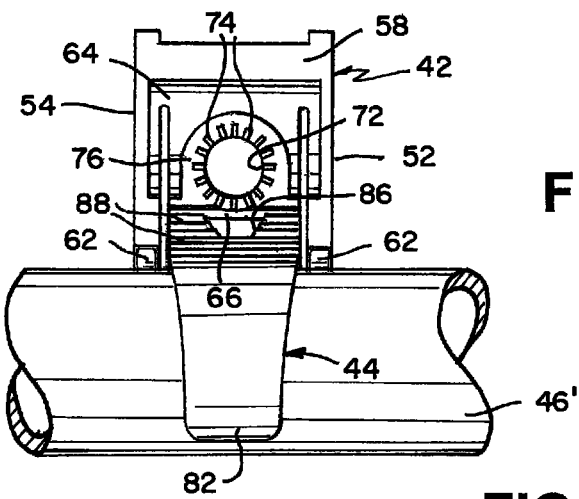
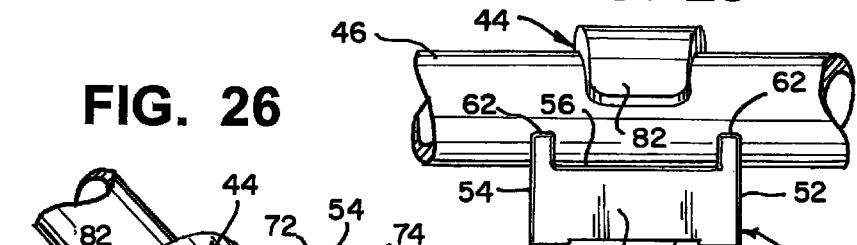
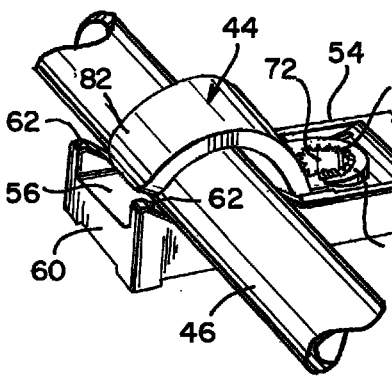
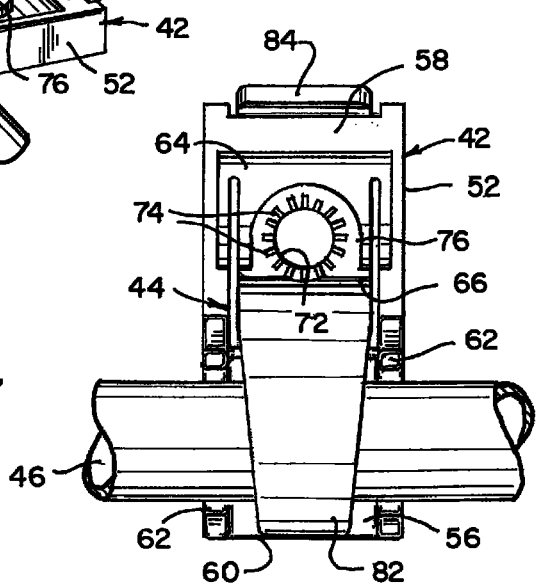
FIG. 24
FIG. 25
FIG. 26
FIG. 27

ADJUSTABLE CONDUIT CLAMP

TECHNICAL FIELD

The present invention relates to an adjustable conduit clamp for mounting a conduit, such as an electrical conduit, to a surface of a structure and, more particularly, to an adjustable conduit clamp for accommodating different size conduits.

BACKGROUND OF THE INVENTION

There are a number of prior art conduit clamps and hangers, such as conduit clamps and hangers sold by the assignee of the present application. Simple conduit hangers have a strap sized for a conduit with a particular diameter, such as a one-half inch diameter size conduit, the hanger having an extending flange with a hole therein for securing to a structure, such as a wall or the like.

There has been a need for an adjustable conduit clamp which can accommodate conduits of different diameter sizes, while providing an efficient and easy mechanism for attachment to a structure, such as a wall, floor, ceiling or the like.

SUMMARY OF THE INVENTION

According to a first embodiment of the present invention, an adjustable conduit clamp to secure a conduit to a structure comprises a clampback having, first and second sidewalls each having a lower edge configured to be placed against a surface of a structure, and a portion of each sidewall configured to support a conduit along an upper edge, a first spacer positioned between said first and second sidewalls at a first region of said first and second sidewalls, a second spacer positioned between said first and second sidewalls at a second region of said first and second sidewalls, a cantilever member extending from the second spacer and positioned between said first and second sidewalls, the cantilever member having a free end movable relative to said first and second sidewalls and spaced from an end of said first spacer so as to form an opening therebetween, the cantilever member having an aperture formed therein dimensioned for receipt of a fastener; and a strap having, a first end portion shaped to contact a conduit positioned between said clampback and said strap, and a second end portion dimensioned for passage through said opening in the clampback so as to be postionable relative to the cantilever member, the second end portion having a cutout region formed therein positionable relative to said cantilever member so as to allow said fastener to pass through the aperture in the cantilever member and said cutout region, thereby securing said conduit between the clampback and the strap.

Another embodiment of the present invention is an adjustable conduit clamp as described above, wherein the first and second portions of the strap are configured to form a generally S-shaped strap.

A further embodiment of the present invention is an adjustable conduit clamp as described above, wherein a lower surface of the cantilever member has a non-smooth configuration at least in a region thereof and wherein the second end portion of the strap has an upper surface having a non-smooth configuration in at least a region thereof and dimensioned for securely engaging with the non-smooth region of the lower surface of the cantilever member.

A still further embodiment of the present invention is an adjustable conduit clamp as described above, wherein the non-smooth configuration of at least a region of the lower surface of the cantilever member and the non-smooth configuration of at least a region of the second end portion of the strap each comprise serrations.

Another embodiment of the present invention is an adjustable conduit clamp as described above, wherein an upper surface of the cantilever member has a non-smooth configuration in the region about at least the aperture formed in the cantilever member.

A further embodiment of the present invention is an adjustable conduit clamp as described above, wherein the clampback includes a third sidewall formed at an end of the first and second sidewalls.

A still further embodiment of the present invention is an adjustable conduit clamp as described above, wherein the portion of each sidewall configured to support a conduit has a generally concave configuration.

Another embodiment of the present invention is an adjustable conduit clamp as described above, wherein the first spacer and the first and second sidewalls at said first region thereof are formed as a solid structure.

A further embodiment of the present invention is an adjustable conduit clamp as described above, wherein the clampback and strap are fabricated from one of zinc alloy, steel, thermoplastic and aluminum.

A still further embodiment of the present invention is an adjustable conduit clamp as described above, wherein a lower surface of the cantilever member has a non-smooth configuration at least in a region thereof and wherein the second end portion of the strap has an upper surface having a non-smooth configuration in at least a region thereof and dimensioned for securely engaging with the non-smooth region of the lower surface of the cantilever member.

A further embodiment of the present invention is an adjustable conduit clamp as described above, wherein the non-smooth configuration of at least a region of the lower surface of the cantilever member and the non-smooth configuration of at least a region of the second end portion of the strap each comprise serrations.

Another embodiment of the present invention is an adjustable conduit clamp as described above, wherein an upper surface of the cantilever member has a non-smooth configuration in the region about at least the aperture formed in the cantilever member.

A further embodiment of the present invention is an adjustable conduit clamp as described above, wherein the clampback includes a third sidewall formed at an end of the first and second sidewalls.

A still further embodiment of the present invention is an adjustable conduit clamp as described above, wherein the portion of each sidewall configured to support a conduit has a generally concave configuration.

Another embodiment of the present invention is an adjustable conduit clamp as described above, wherein the clampback has a surface between the sidewalls to support a conduit.

A further embodiment of the present invention is an adjustable conduit clamp as described above, wherein a bottom is positioned between the sidewalls at said first region of the first and second sidewalls.

According to another embodiment of the present invention, an adjustable conduit strap to secure a conduit to a structure comprises a clampback having, a conduit support portion dimensioned to support a conduit on a first side and to contact a surface of a structure on another side, and first and second sidewalls connected to said conduit support portion, said sidewalls each having a lower edge configured to contact the surface of the structure, a spacer positioned between said first and second sidewalls, a cantilever member extending from the spacer and positioned between said first and second sidewalls, the cantilever member having a free end movable relative to said first and second sidewalls and spaced from an end of said conduit support portion to form an opening therebetween, the cantilever member having an aperture formed therein dimensioned for receipt of a fastener; and a strap having, a first end portion shaped to contact a conduit positioned between said clampback and said strap, and a second end portion dimensioned for passage through said opening in the clampback so as to be postionable relative to the cantilever member, the second end portion having a cutout region formed therein positionable relative to said cantilever member so as to allow said fastener to pass through the aperture in the cantilever member and said cutout region, thereby securing said conduit between the clampback and the strap as the cantilever member free end is pulled toward the structure when the fastener is advanced into the structure.

Another embodiment of the present invention is an adjustable conduit clamp as described above, wherein the first and second portions of the strap are configured to form a generally S-shaped strap.

A further embodiment of the present invention is an adjustable conduit clamp as described above, wherein a lower surface of the cantilever member has a non-smooth configuration at least in a region thereof and wherein the second end portion of the strap has an upper surface having a non-smooth configuration in at least a region thereof and dimensioned for securely engaging with the non-smooth region of the lower surface of the cantilever member.

A still further embodiment of the present invention is an adjustable conduit clamp as described above, wherein the non-smooth configuration of at least the region of the lower surface of the cantilever member and the non-smooth configuration of at least the region of the second end portion of the strap each comprise serrations.

Another embodiment of the present invention is an adjustable conduit clamp as described above, wherein an upper surface of the cantilever member has a non-smooth configuration in the region about at least the aperture formed in the cantilever member.

A further embodiment of the present invention is an adjustable conduit clamp as described above, wherein the first side of the conduit support portion has a generally concave configuration.

A still further embodiment of the present invention is an adjustable conduit clamp as described above, wherein the clampback and strap are fabricated from one of zinc alloy, steel, thermoplastic and aluminum.

Another embodiment of the present invention is an adjustable conduit clamp as described above, wherein a lower surface of the cantilever member has a non-smooth configuration at least in a region thereof and wherein the second end portion of the strap has an upper surface having a non-smooth configuration in at least a region thereof and dimensioned for securely engaging with the non-smooth region of the lower surface of the cantilever member.

A further embodiment of the present invention is an adjustable conduit clamp as described above, wherein the non-smooth configuration of at least the region of the lower surface of the cantilever member and the non-smooth configuration of at least the region of the second end portion of the strap each comprise serrations.

A further embodiment of the present invention is an adjustable conduit clamp as described above, wherein an upper surface of the cantilever member has a non-smooth configuration in the region about at least the aperture formed in the cantilever member.

A still further embodiment of the present invention is an adjustable conduit clamp as described above, wherein the conduit support portion is formed by first and second sidewalls.

BRIEF DESCRIPTION OF THE DRAWINGS

For a further understanding of the nature of the present invention, reference is made to the following detailed description taken in connection with the following drawings, in which:

FIG. 3 is a second perspective view of the conduit clamp shown in FIGS. 1 and 2, without a conduit secured therein and showing the underside of a portion of a strap of the mounting system that contacts a conduit.

FIG. 5 is a top perspective view of the clampback according to the present invention.

FIG. 5A is a top perspective view of the clampback according to another embodiment of the present invention.

FIG. 6 is a bottom perspective view of the clampback according to the present invention.

FIG. 6A is a bottom perspective view of the clampback according to another embodiment of the present invention.

FIG. 7 is a top view of the clampback according to the present invention.

FIG. 8 is a left side view of the clampback according to the present invention.

FIG. 9 is a left side cross-sectional view of the clampback taken along line 9-9 of FIG. 5.

FIG. 10 is a bottom view of the clampback according to the present invention.

FIG. 11 is a top perspective view of the strap forming part of the mounting system according to the present invention.

FIG. 12 is a second top perspective view of the strap according to the present invention.

FIG. 13 is a top view of the strap according to the present invention.

FIG. 14 is a bottom view of the strap according to the present invention.

FIG. 15 is a side view of the strap according to the present invention.

FIG. 24 is a top view of the clamp with the conduit shown in FIGS. 22 and 23 mounted therein.

FIG. 25 is a front view of adjustable conduit clamp with a conduit of a smaller size than that shown in FIG. 22 mounted therein.

FIG. 26 is a perspective view of the clamp with the conduit secured therein.

FIG. 27 is a top view of the clamp with the conduit shown in FIGS. 22 and 23 mounted therein.

DETAILED DESCRIPTION

Figure 1:
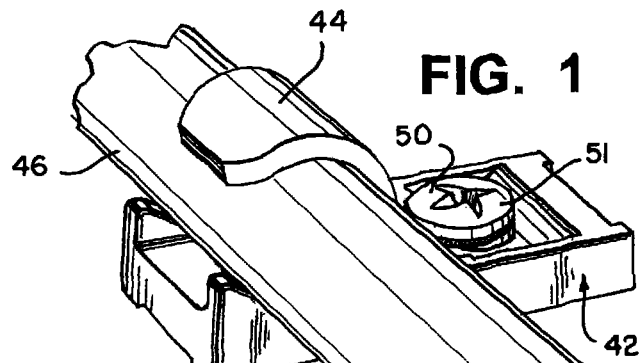
FIG. 1 is a perspective view of an adjustable conduit clamp according to the present invention showing the clamp securing a conduit therein.
Figure 2:
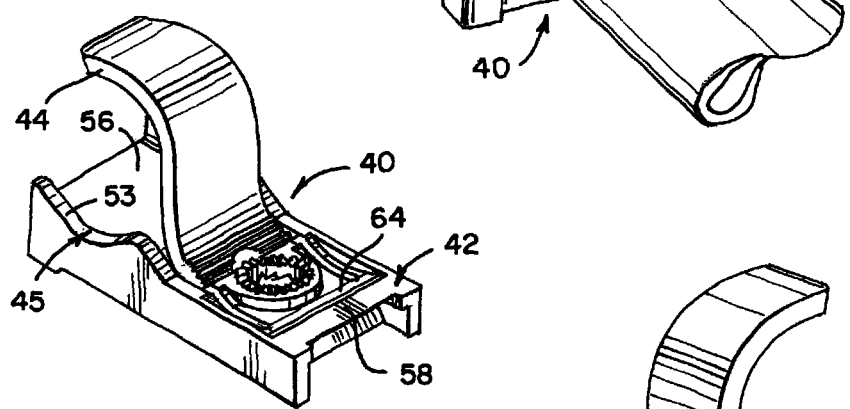
FIG. 2 is a perspective view of the conduit clamp without a conduit secured therein.
Figure 4:
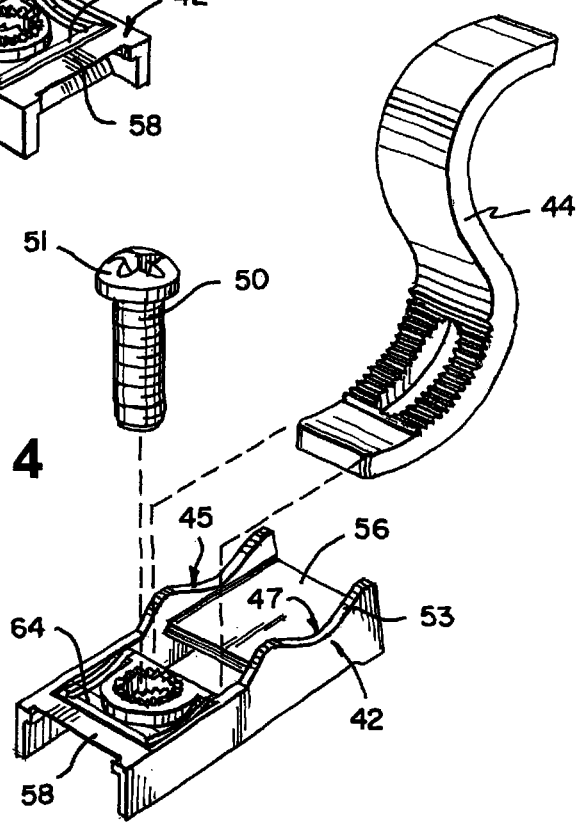
FIG. 4 is an exploded perspective view of the mounting system showing the arrangement of the strap relative to a clampback of the mounting system, as well as a fastener used to secure the strap to the clampback when the adjustable clamp is mounted on a structure.
Figure 16:
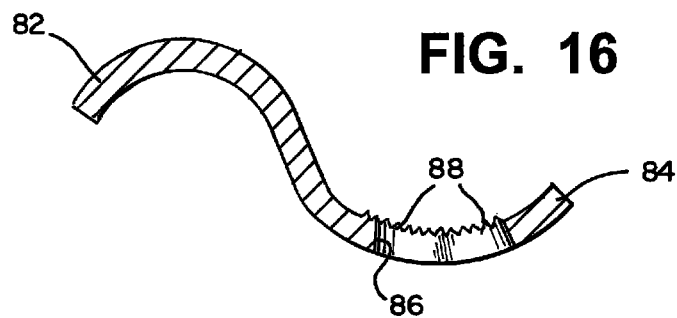
FIG. 16 is a side cross-sectional view of the strap taken along line 16-16 of FIG. 13.
Figure 17:
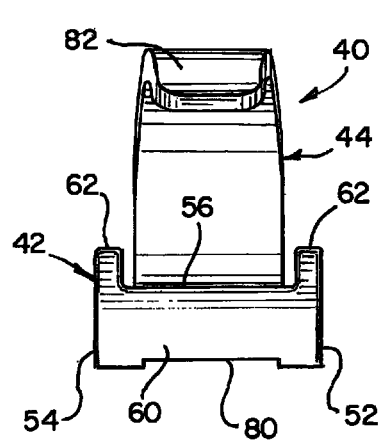
FIG. 17 is a front view of the adjustable conduit clamp according to the present invention showing both the clampback and the strap, but without a conduit positioned therein.
Figure 18:
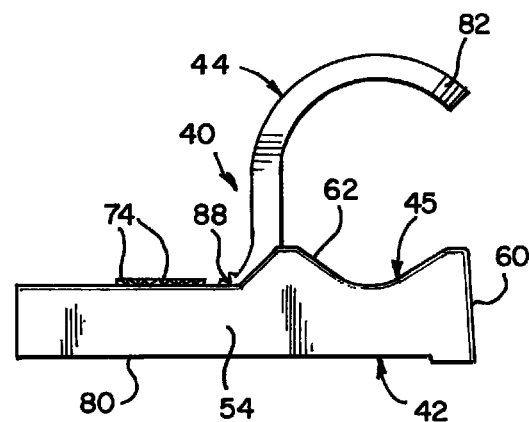
FIG. 18 is a right side view of the adjustable conduit clamp according to the present invention.
Figure 19:
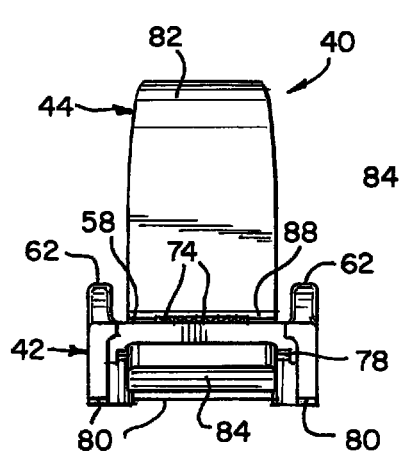
FIG. 19 is a back view of the adjustable conduit clamp according to the present invention.
Figure 20:
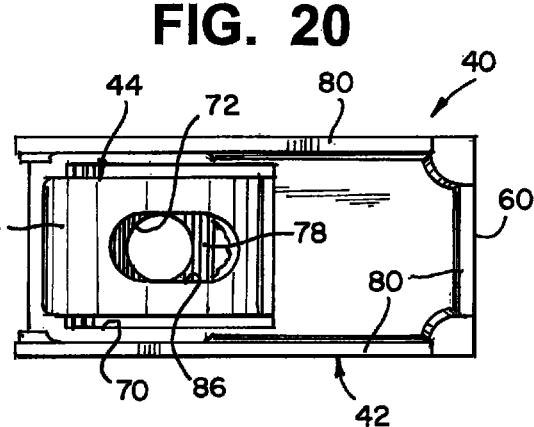
FIG. 20 is a bottom view of the adjustable conduit clamp according to the present invention.
Figure 21:
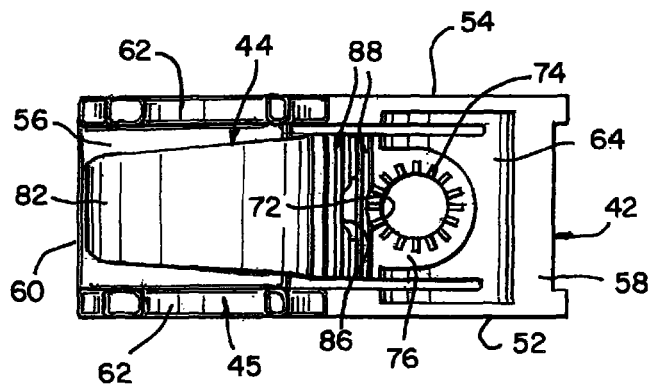
FIG. 21 is a top view of the adjustable conduit clamp according to the present invention.
Figure 22:
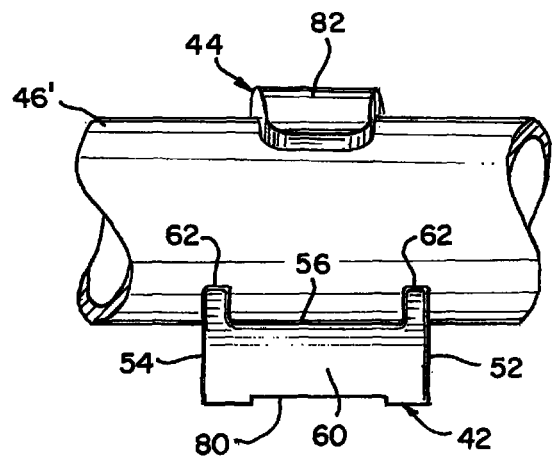
FIG. 22 is a front view of the adjustable conduit clamp with a conduit of a first large size mounted therein.

As best seen in FIGS. 1-4, as well as the remaining figures, an embodiment of the present invention is an adjustable conduit clamp 40 comprising a clampback 42 and a strap 44. These two components are designed to cooperate with each other so as to secure a conduit 46, such as an electrical conduit, to a structure 49, such as a wall, floor, ceiling or the like. The clamp itself is thus secured to the structure by the fastener 50, such as a wood screw, machine screw or any other type of fastener, that can penetrate through a surface 48 of the structure 49.

As mentioned above, the adjustable conduit clamp comprises two components, clampback 42 and strap 44. Views of the clampback in isolation are shown in FIGS. 5-10, while FIGS. 11-16 are views of the strap in isolation.

More particularly, FIG. 5 is a top perspective view of clampback 42 showing that the clampback has a conduit support portion 45 dimensioned to support a conduit 46,46' (see, e.g., FIGS. 1, 22-32). The conduit support portion in an embodiment of the invention can be formed by sidewalls 52 and 54 which have a similar configuration and are spaced apart from each other at a first region 59 thereof by a first spacer 56. The sidewalls also have a second spacer 58 at an end opposite (second region) the conduit support portion. A third sidewall 60 can optionally be spaced across the sidewalls 52 and 54.

Figure 29:
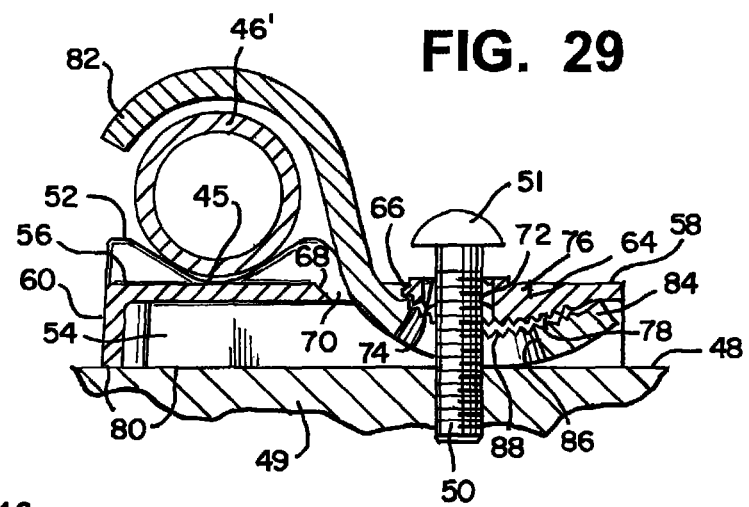
FIGS. 29-32 show a series of cross-sectional views of the clamp as it is secured around a conduit by attaching the fastener to a structure, such as a wall or the like, and illustrating the deflection of a cantilever member of the clampback, thereby urging the strap against the conduit and securing the conduit thereto.
Figure 30:
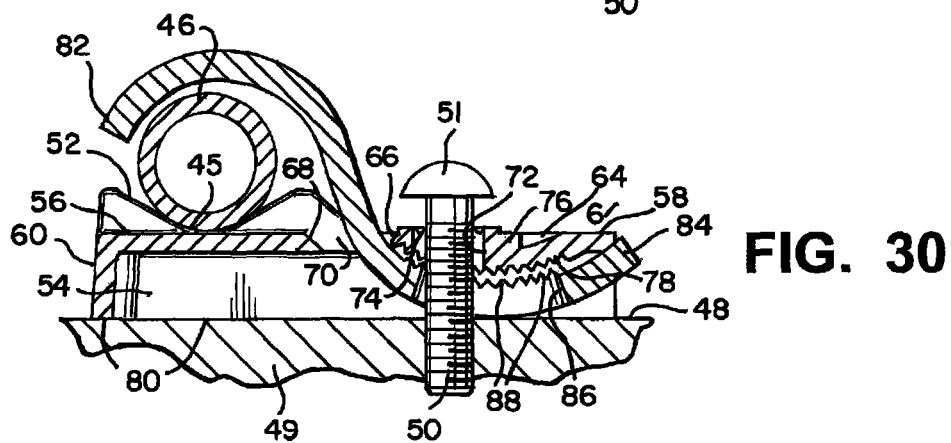

Sidewalls 52 and 54 each have an upper edge 62 at one end thereof whose shape is dimensioned to support of a conduit 46 as seen in FIGS. 1, 22-32, and especially FIGS. 29-32. FIGS. 29 and 30 specifically show that the upper edge 62 of the sidewalls can accommodate conduits 46 and 46' with different diameters.

It should be noted that the first spacer 56, third sidewall 60 and the first region of the sidewalls can be formed with a bottom 57 as seen in FIG. 6A, illustrating an alternate embodiment of the present invention. It should also be noted that as seen in an embodiment shown in FIG. 5A, a surface 63 can span the region between edges to form part of the conduit support portion of the clampback.

The clampback further comprises a cantilever member 64 as best seen in FIGS. 5-7 and 10. This cantilever member attaches to the second spacer and extends between sidewalls 52 and 54 so as to be movable between these sidewalls. The cantilever member has a free end 66 which is spaced from an end 68 of first spacer 56, thereby forming an opening 70 therebetween. The cantilever member also has an aperture 72 formed therein for passage of fastener 50 as seen in FIG. 1. The portion of the cantilever member that forms aperture 72 may have serrations 74 formed therein to facilitate securement of fastener 50 to the cantilever member. Instead of serrations, other raised or depressed structures, such as dimples, depressions and the like may be used to perform a similar securing function relative to the fastener and the cantilever member, as well known in the art.

Furthermore, the portion of the cantilever member that has the aperture formed therein may have a raised structure 76 relative to the remaining portion of the cantilever member.

Furthermore, the underside of the cantilever member may have serrations 78 or other non-uniformities in its surface to secure the strap thereto as explained more fully below. As can be seen in FIGS. 4-10, the sidewalls forming the clampback each have a lower edge 80 dimensioned for contacting a surface 48 of a structure 49. Preferably, the edges 80 and 82 of sidewalls 52 and 54 contact such a surface while edge 80 of third sidewall 60 may or may not contact the surface. Although the clampback uses sidewalls as part of its structure, part of these sidewalls (and first spacer) may be replaced by a solid bottom 57 as seen in FIG. 6A. Thus, the conduit support portion 45 only requires a first side 47 to contact a surface of a conduit and another side 53 to contact a surface of a structure.

As seen in FIGS. 11-16, strap 44 includes a first end portion 82 and a second end portion 84. The two end portions are joined together so that the strap has a generally S-shaped configuration in an embodiment of the strap. Other shapes can be used as described more fully below. Typically the strap is formed from a single integral material. The first end portion thus has a curved orientation which is dimensioned for contacting a conduit 46, 46' as illustrated in FIGS. 1 and 22-32.

The second end portion 84 also has a curved configuration whose curvature is similar to that of the underside of the cantilever member. The second end portion includes a cutout region 86 so as to allow passage of fastener 50 while providing that the strap can be moved relative to the cantilever member 64. In this manner, conduits of different sizes can be securely mounted by the clamp.

Figure 23:
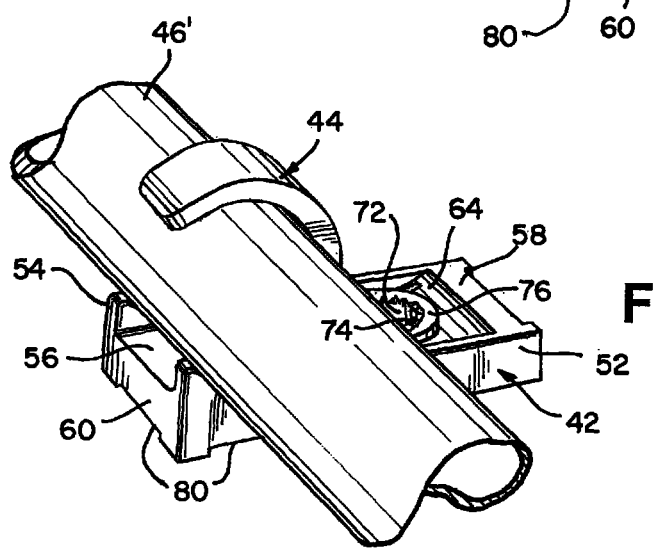
FIG. 23 is a perspective view of the clamp with the conduit secured therein.
Figure 28:
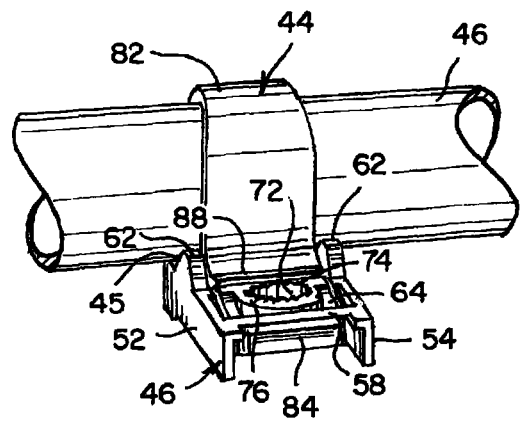
FIG. 28 is a rear perspective view of the adjustable conduit clamp having a conduit mounted therein.

FIGS. 23 and 26 show that when the clamp secures to a conduit having a small diameter (conduit 46), the second portion of the strap terminates further back relative to the clampback than when the clamp is secured to a conduit 46' having a larger diameter. Furthermore, the strap is sized in terms of its width so as to pass through the opening 70 between the cantilever member and the first spacer as clearly seen in FIGS. 29-32.

Figure 31:
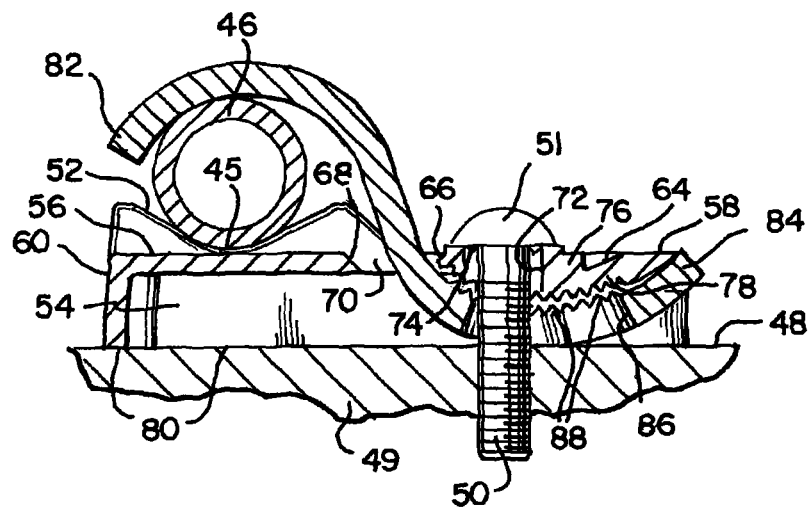
Figure 32:
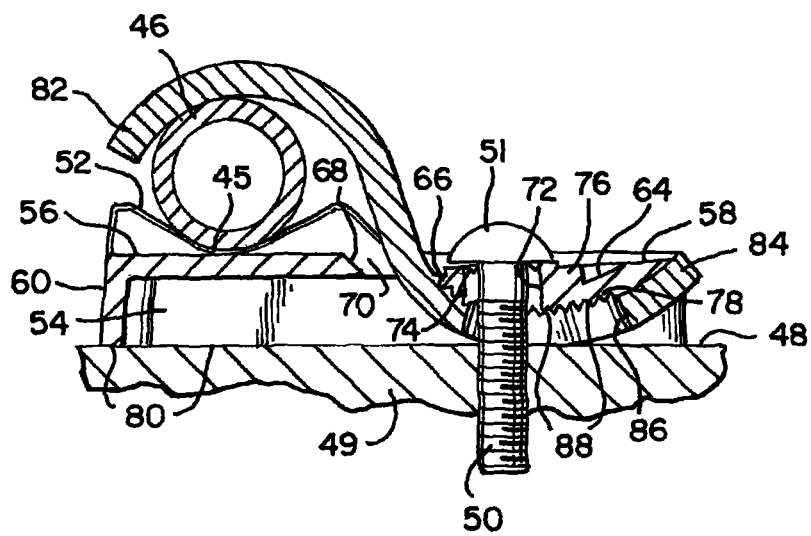

FIGS. 11-13, 15 and 16 also show that the upper surface of the second portion of the strap can include serrations 88 which are preferably dimensioned for interfitting with serrations 78 on the underside of cantilever member 64, thereby securing the strap to the clampback when the fastener is secured into structure 49 as best seen in FIGS. 29-32. FIG. 32 also clearly shows that when the fastener 50 is secured to a structure, the cantilever member is deflected downwardly relative to sidewalls 52 and 54 which provides for the secure interfitment of the serrations 78 of the cantilever member and 88 of the strap.

Although serrations are shown with respect to the cantilever member and the strap, other types of non-uniform structures for these surfaces can be used for securely retaining the strap to the cantilever member. Such non-uniform or roughness-type surfaces could include, for example, peaks and valleys on the respective surfaces. The underlying characteristic of the two surfaces is to maintain a roughness therebetween to minimize slippage when the underside of the cantilever member is urged against the upper surface of the second end portion of the strap. The overall result is a secure mounting of the conduit 46, 46' to the adjustable conduit clamp 40.

Operation of the Adjustable Conduit Clamp

As stated above, the adjustable conduit clamp is typically used to secure a conduit, such as an electrical conduit 46, 46' to a structure 49, such as a wall, ceiling, floor or other structural element. Initially, clampback 42 is positioned beneath a portion of the conduit such that upper edge 62 of sidewalls 52, 54 support the conduit as seen in FIGS. 29-30. Once the conduit is positioned on these upper surfaces, the strap 44 is positioned in opening 70 so that the second end portion 84 thereof is slid beneath the cantilever member 64 until the first portion of the strap 82 is in proximity with the conduit. Fastener 50 is then inserted through aperture 72 in the cantilever member, as well as through cutout region 86 in the second end portion of the strap as best seen in FIGS. 29 and 30 for two different size conduits 46' and 46.

Thus, after the strap is positioned through the opening 70 in the clampback, the strap and clampback are adjusted in relation to each other in what might be called a course adjustment so that the strap is positioned close to or against the conduit and with the mating serrations between the cantilever member and the strap maintaining this relationship as the installer inserts the fastener through the clampback and strap. The tightening action of the fastener as the fastener head 51 engages with the cantilever member pulls down and thereby deflects the cantilever member.

FIGS. 31 and 32 then show, for the example of conduit 46, that the fastener is threaded into structure 49. The underside of the fastener head 51 then bends the cantilever member in a downward direction relative to the clampback, toward the surface 48 of structure 49 and in so doing, engages the underside of the cantilever member with the second end portion of the strap, thereby securely forcing the first end portion of the strap toward the conduit holding upper edges 62 of the clampback and thereby securing the conduit therebetween. The cantilever member and the second portion of the strap have their respective serrations interposed with each other during this process as best seen in a comparison of FIGS. 31 and 32. In this way, the strap is pulled in a downward tightening direction so as to secure the conduit as shown in FIG. 32. The serrations when interposed with each other hold the strap securely to the clampback, minimizing slippage therebetween.

The clampback and strap of the adjustable conduit clamp can be fabricated from various materials, including zinc alloy, steel, thermoplastics and aluminum. The adjustable conduit clamp is particularly suited for mounting various types of conduit, including ½ inch, ¾ inch and 1 inch electrical metallic conduit (EMT), flexible metallic conduit (FMC), rigid conduit, liquid tight FMC, as well as armored cable (type AC) and metal clad cable (type MM). It should be noted that the clampback and strap can each be formed as integral parts, formed by stamping or molding. Although the specific embodiment of the present invention can accommodate such conduits ranging from one half inch diameter to greater than one inch in diameter, the adjustable conduit mounting strap could be sized for larger or smaller conduits, if desired.

Thus, what has been described is an adjustable conduit clamp which easily and securely engages conduits of various sizes while facilitating the installation of the clamp due to the interaction of its clampback and strap.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An adjustable conduit clamp to secure a conduit to a structure comprising:
   a clampback having,
      first and second sidewalls each having a lower edge configured to be placed against a surface of a structure, and a portion of each sidewall configured to support a conduit along an upper edge,
      a first spacer positioned between said first and second sidewalls at a first region of said first and second sidewalls,
      a second spacer positioned between said first and second sidewalls at a second region of said first and second sidewalls,
      a cantilever member extending from the second spacer and positioned between said first and second sidewalls, the cantilever member having a free end movable relative to said first and second sidewalls and spaced from an end of said first spacer so as to form an opening therebetween, the cantilever member having an aperture formed therein dimensioned for receipt of a fastener; and
   a strap having,
      a first end portion shaped to contact a conduit positioned between said clampback and said strap, and
      a second end portion dimensioned for passage through said opening in the clampback so as to be positionable relative to the cantilever member, the second end portion having a cutout region formed therein positionable relative to said cantilever member so as to allow said fastener to pass through the aperture in the cantilever member and said cutout region, thereby securing said conduit between the clampback and the strap as the cantilever member free end is pulled toward the structure when the fastener is advanced into the structure.

2. The adjustable conduit clamp according to claim 1, wherein the first and second portions of the strap are configured to form a generally S-shaped strap.

3. The adjustable conduit clamp according to claim 2, wherein a lower surface of the cantilever member has a non-smooth configuration at least in a region thereof and wherein the second end portion of the strap has an upper surface having a non-smooth configuration in at least a region thereof and dimensioned for securely engaging with the non-smooth region of the lower surface of the cantilever member.

4. The adjustable conduit clamp according to claim 3, wherein the non-smooth configuration of at least the region of the lower surface of the cantilever member and the non-smooth configuration of at least the region of the second end portion of the strap each comprise serrations.

5. The adjustable conduit clamp according to claim 4, wherein an upper surface of the cantilever member has a non-smooth configuration in the region about at least the aperture formed in the cantilever member.

6. The adjustable conduit clamp according to claim 5, wherein the clampback includes a third sidewall formed at an end of the first and second sidewalls.

7. The adjustable conduit clamp according to claim 6, wherein the portion of each sidewall configured to support a conduit has a generally concave configuration.

8. The adjustable conduit clamp according to claim 1, wherein the first spacer and the first and second sidewalls at said first region thereof are formed as a solid structure.

9. The adjustable conduit clamp according to claim 1, wherein the clampback and strap are fabricated from one of zinc alloy, steel, thermoplastic and aluminum.

10. The adjustable conduit clamp according to claim 1, wherein a lower surface of the cantilever member has a non-smooth configuration at least in a region thereof and wherein the second end portion of the strap has an upper surface having a non-smooth configuration in at least a region thereof and dimensioned for securely engaging with the non-smooth region of the lower surface of the cantilever member.

11. The adjustable conduit clamp according to claim 10, wherein the non-smooth configuration of at least the region of the lower surface of the cantilever member and the non-smooth configuration of at least the region of the second end portion of the strap each comprise serrations.

12. The adjustable conduit clamp according to claim 1, wherein an upper surface of the cantilever member has a non-smooth configuration in the region about at least the aperture formed in the cantilever member.

13. The adjustable conduit clamp according to claim 1, wherein the clampback includes a third sidewall formed at an end of the first and second sidewalls.

14. The adjustable conduit clamp according to claim 1, wherein the portion of each sidewall configured to support a conduit has a generally concave configuration.

15. The adjustable conduit clamp according to claim 1, wherein the clampback has a surface between the sidewalls to support a conduit.

16. The adjustable conduit clamp according to claim 1, wherein a bottom is positioned between the sidewalls at said first region of the first and second sidewalls.

17. An adjustable conduit clamp to secure a conduit to a structure comprising:
a clampback having,
a conduit support portion dimensioned to support a conduit on a first side and to contact a surface of a structure on another side, and
first and second sidewalls connected to said conduit support portion, said sidewalls each having a lower edge configured to contact the surface of the structure,
a spacer positioned between said first and second sidewalls,
a cantilever member extending from the spacer and positioned between said first and second sidewalls, the cantilever member having a free end movable relative to said first and second sidewalls and spaced from an end of said conduit support portion to form an opening therebetween, the cantilever member having an aperture formed therein dimensioned for receipt of a fastener; and
a strap having,
a first end portion shaped to contact a conduit positioned between said clampback and said strap, and
a second end portion dimensioned for passage through said opening in the clampback so as to be postionable relative to the cantilever member, the second end portion having a cutout region formed therein positionable relative to said cantilever member so as to allow said fastener to pass through the aperture in the cantilever member and said cutout region, thereby securing said conduit between the clampback and the strap as the cantilever member free end is pulled toward the structure when the fastener is advanced into the structure.

18. The adjustable conduit clamp according to claim 17, wherein the first and second portions of the strap are configured to form a generally S-shaped strap.

19. The adjustable conduit clamp according to claim 18, wherein a lower surface of the cantilever member has a non-smooth configuration at least in a region thereof and wherein the second end portion of the strap has an upper surface having a non-smooth configuration in at least a region thereof and dimensioned for securely engaging with the non-smooth region of the lower surface of the cantilever member.

20. The adjustable conduit clamp according to claim 19, wherein the non-smooth configuration of at least the region of the lower surface of the cantilever member and the non-smooth configuration of at least the region of the second end portion of the strap each comprise serrations.

21. The adjustable conduit clamp according to claim 20, wherein an upper surface of the cantilever member has a non-smooth configuration in the region about at least the aperture formed in the cantilever member.

22. The adjustable conduit clamp according to claim 21, wherein the first side of the conduit support portion has a generally concave configuration.

23. The adjustable conduit clamp according to claim 17, wherein the clampback and strap are fabricated from one of zinc alloy, steel, thermoplastic and aluminum.

24. The adjustable conduit clamp according to claim 17, wherein a lower surface of the cantilever member has a non-smooth configuration at least in a region thereof and wherein the second end portion of the strap has an upper surface having a non-smooth configuration in at least a region thereof and dimensioned for securely engaging with the non-smooth region of the lower surface of the cantilever member.

25. The adjustable conduit clamp according to claim 24, wherein the non-smooth configuration of at least the region of the lower surface of the cantilever member and the non-smooth configuration of at least the region of the second end portion of the strap each comprise serrations.

26. The adjustable conduit clamp according to claim 17, wherein an upper surface of the cantilever member has a non-smooth configuration in the region about at least the aperture formed in the cantilever member.

27. The adjustable conduit clamp according to claim 17, wherein the conduit support portion is formed by first and second sidewalls.

28. An adjustable conduit clamp to secure a conduit to a structure comprising:
a clampback having,
means for supporting a conduit, and first and second sidewalls connected to said means for supporting a conduit, said sidewalls each having a lower edge configured to contact the surface of the structure, a spacer positioned between said first and second sidewalls, a cantilever member extending from the spacer and positioned between said first and second sidewalls, the cantilever member having a free end movable relative to said first and second sidewalls and spaced from an end of said conduit support portion to form an opening therebetween, the cantilever member having an aperture formed therein dimensioned for receipt of a fastener; and a strap having, a first end portion shaped to contact a conduit positioned between said clampback and said strap, and a second end portion dimensioned for passage through said opening in the clampback so as to be postionable relative to the cantilever member, the second end portion having a cutout region formed therein positionable relative to said cantilever member so as to allow said fastener to pass through the aperture in the cantilever member and said cutout region, thereby securing said conduit between the clampback and the strap as the cantilever member free end is pulled toward the structure when the fastener is advanced into the structure.

\* \* \* \* \*